United States Patent [19]
Locke

[11] Patent Number: 5,406,842
[45] Date of Patent: Apr. 18, 1995

[54] METHOD AND APPARATUS FOR MATERIAL LEVEL MEASUREMENT USING STEPPED FREQUENCY MICROWAVE SIGNALS

[75] Inventor: John W. Locke, Tempe, Ariz.

[73] Assignee: Motorola, Inc., Schaumburg, Ill.

[21] Appl. No.: 132,981

[22] Filed: Oct. 7, 1993

[51] Int. Cl.⁶ .......................................... G01F 23/28
[52] U.S. Cl. ............................ 73/290 R; 364/509; 364/562; 342/124; 342/129; 324/643; 324/644
[58] Field of Search ............ 73/290 R; 342/124, 129; 364/509, 562, 581; 324/643, 644

[56] References Cited

U.S. PATENT DOCUMENTS

| | | | |
|---|---|---|---|
| 3,428,815 | 2/1969 | Thompson . | |
| 3,447,374 | 6/1969 | Cohn et al. . | |
| 3,603,995 | 9/1971 | Howard | 342/129 |
| 3,750,172 | 7/1973 | Tresselt | 342/129 |
| 3,884,074 | 5/1975 | Robertsson | 73/290 V |
| 3,888,588 | 6/1975 | Granqvist | 356/5 |
| 4,044,353 | 8/1977 | Levy . | |
| 4,044,355 | 8/1977 | Edvardsson . | |
| 4,106,020 | 8/1978 | Johnson . | |
| 4,170,311 | 10/1979 | Spaw | 414/289 |
| 4,205,315 | 5/1980 | Fleenor . | |
| 4,245,221 | 1/1981 | Kipp et al. . | |
| 4,345,106 | 8/1982 | Canfield et al. | 73/290 R |
| 4,360,812 | 11/1982 | Peperone . | |
| 4,425,793 | 1/1984 | Turton et al. | 73/290 R |
| 4,458,530 | 7/1984 | Bastida | 73/290 R |
| 4,566,321 | 1/1986 | Zacchio | 73/290 R |
| 4,569,599 | 2/1986 | Bolkow et al. | 368/120 |
| 4,641,139 | 2/1987 | Edvardsson | 343/124 |
| 4,661,817 | 4/1987 | Bekkadal et al. | 73/290 R |
| 4,665,403 | 5/1987 | Edvardsson | 342/124 |
| 4,807,471 | 2/1989 | Cournane et al. | 73/290 R |
| 4,833,918 | 5/1989 | Jean et al. | 73/290 V |
| 4,901,245 | 2/1990 | Olson et al. | 364/509 |
| 5,005,018 | 4/1991 | Walters | 342/202 |
| 5,070,730 | 12/1991 | Edvardsson | 73/290 V |
| 5,115,242 | 5/1992 | Nagamune et al. | 342/124 |
| 5,136,299 | 8/1992 | Edvardsson | 342/124 |
| 5,148,177 | 9/1992 | Nagamune et al. | 342/124 |
| 5,182,565 | 1/1993 | Nagamune et al. | 342/124 |

OTHER PUBLICATIONS

"A Comparative Analysis: Volume and Mass Derived from Tank Gauging Systems" by W. Oglesby, ENRAF Nonius Tank Inventory Systems, ©ISA, 1989-Paper #89-0665, pp. 1493-1504.

"A Description of a New Radar Tank Gauge and the Methods used to Facilitate Installation" by H. G. Westerlind et al., ©ISA, 1992-Paper #92-0391, pp. 1141-1148.

"Calibration and Accuracy of Radar Level Gauges" by O. Edvardsson, Saab Marine Electronics AB, ©ISA, 1992-Paper #92-0390, pp. 1137-1140.

"Continuous Level Measurement Using Phase Tracking" by T. Cournane et al., *Measurements & Control*, Jun., 1993, pp. 110-113.

"Level Gauging by Radar" by H. G. Westerlind, ©ISA, 1989-Paper #89-0644, pp. 1385-1396.

(List continued on next page.)

*Primary Examiner*—Diego F. F. Gutierrez
*Attorney, Agent, or Firm*—Jeffrey D. Nehr

[57] ABSTRACT

A method and apparatus for measuring a level of a material in a tank includes providing a stepped frequency microwave signal to an antenna of a transmitter and receiving in the antenna a received signal from a surface of the material at the level to be measured. A measuring signal containing ranging and calibrating signals is processed in even and odd sample sets input to contiguous narrowband filters formed digitally in a processor using DFT and other algorithms to form true in-phase and quadrature outputs. These outputs are combined and further processed using an interpolation algorithm to isolate ranging and calibration frequency components and to accurately measure the distances represented by such components. The calibration distance associated with the calibration frequency component is compared to a known delay line length and any determined error is used to correct the ranging distance associated with the ranging frequency component.

12 Claims, 4 Drawing Sheets

OTHER PUBLICATIONS

"Microwave Radar Level" by L. Kolbert, TN Technologies, Inc., A Baker Hughes Company, ©1991 TN Technologies, Inc.

"Microwave Radar Targets Tough Application" by D. Robertson, INTECH Industry, Mar. 1992, INTECH, pp. 39–40.

"Radar Gauges Applied to Difficult Tank Gauging Applications" by W. Oglesby, ENRAF Nonius Tank Inventory Systems, Inc., ©1989, pp. 1879–1890.

"Radar Level Now Comes in a Hole New Size!", TN Technologies, Inc., A Baker Hughes Company, ©1991 TN Technologies, Inc.

"Using Radar Level Measurement for Increased Environmental Protection and Plant Safety" by J. L. Daniewicz, TN Technologies, Inc., ©1991, Instrument Society of American Reprinted with permission from, *Advances in Instru. & Ctrl.*, vol. 46, Part 2, pp. 1201–1211.

"Vapour-Phase Mass Measurements in Tanks" by O. Edvardsson, Saab Marine Electronics AB, ©, 1992–Paper #92-0389, pp. 1133–1135.

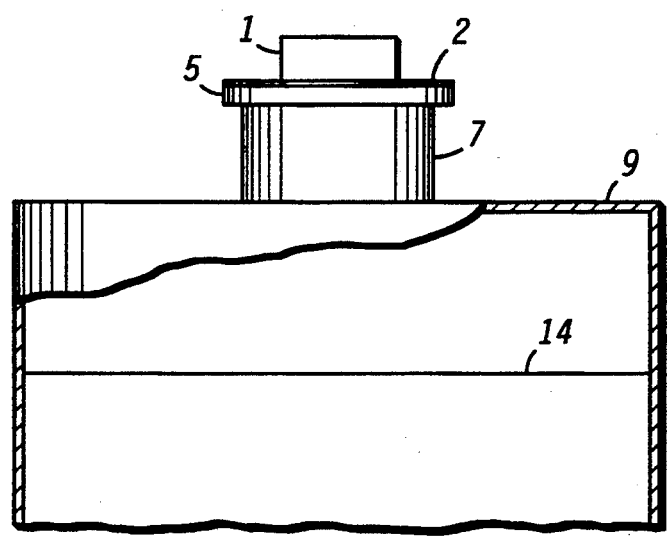
FIG. 1
FIG. 2
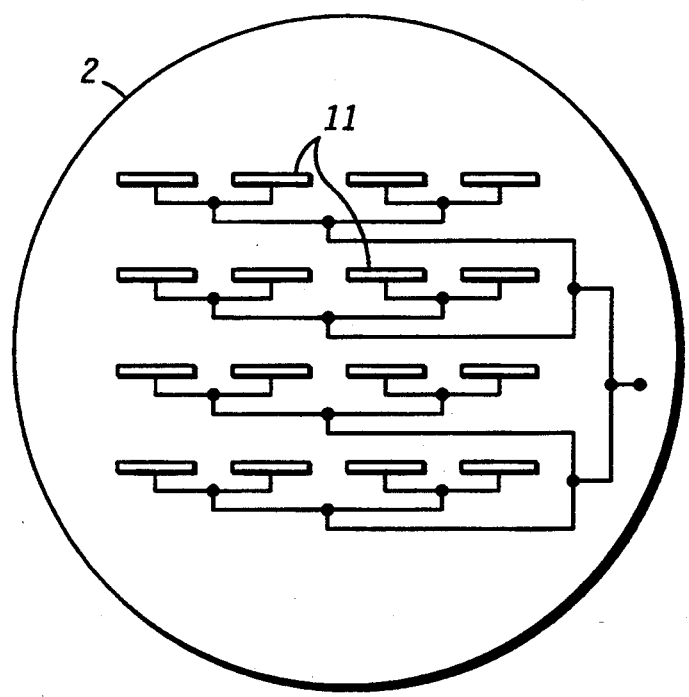

METHOD AND APPARATUS FOR MATERIAL LEVEL MEASUREMENT USING STEPPED FREQUENCY MICROWAVE SIGNALS

FIELD OF THE INVENTION

This invention relates in general to measuring the level of a material or liquid in a storage tank, and in particular to an apparatus and method for such measuring using microwave signals in, for example, a large storage tank or a smaller process tank.

BACKGROUND OF THE INVENTION

Accurate level measurement is required for inventory control and custody transfer in industries where liquids such as oil, tar, chemicals and other materials are stored in large tanks. Large storage tanks may be on the order of 30 meters (100 feet) deep and 30 to 60 meters (100–200 feet) across. Process tanks may be on the order of 3 to 5 meters (10 to 17 feet) deep and 3 to 5 meters (10 to 17 feet) across. Historically, liquid levels have been measured by lowering a device into the tank from a roof-mounted platform. Devices used for this purpose have included long sticks and both manual and automated versions of weighted strings or wires which can be lowered into the tank until the liquid (or solid) content is touched. The depth of the material in the tank, and thus the volume of material in the tank, can then be readily determined from the length of the stick, string, or wire. The early use of sticks has led to the term "sticking the tank" for describing the level measurement procedure. While such mechanical methods have continuously been improved and can achieve a very high accuracy in some applications, all such methods require a physical intrusion of the tank environment. There is thus a potential for contamination of the tank contents and for the corrosion, and the ultimate destruction of the measuring device itself.

Over the past approximately fifteen years, various level measuring devices using radar techniques have been developed (see, e.g., U.S. Pat. No. 4,044,355 and U.S. Pat. No. 4,665,403). With the use of radar techniques the material to be measured is not touched; however, the antenna which radiates and receives microwave energy in order to make the measurement, is mounted inside the tank. In many tank environments, a corrosive gaseous atmosphere exists in the space above the liquid and the antenna material erodes. The antenna material thus contaminates the tank contents. These radar-type devices are also relatively expensive compared to the mechanical-type devices.

In some recently described devices, the antenna is separated from the tank contents by a transparent window. However, in these devices, the vertical profile is thus increased by the length of the antenna.

Typical radar-type level measuring devices employ horn antennas or parabolic reflector antennas which extend inside the tank, and use FM-CW (continuous wave) waveforms in which the frequency of the transmitted signal is linearly swept over about one (1) gigahertz (GHz). The received signal is mixed directly with the transmitted signal to form a mixer output signal whose frequency (the measuring frequency) is constant and is directly proportional to the distance from the antenna to the reflecting surface (the material whose level is to be measured). Such systems also employ various methods to attempt to correct for the non-linearity of the swept waveform, and hybrid analog/-digital implementations of tracking filters which serve to process the signal such that the frequency of the mixer output signal can be correctly estimated and the liquid level can be determined.

Thus, what is needed is a level measuring method and apparatus which includes an antenna implementation which can be outside the tank interior atmosphere and have a low vertical profile. Such a system would desirably use a waveform which does not require sweeping the frequency of the transmitted waveform, and minimize part count by using a single receive path with one microwave mixer, one receiver amplifier, and one analog to digital (ND) converter. Such a system would also desirably use all digital processing after the first receiver amplifier to minimize contributors to the measurement error, and use digital processing algorithms to further minimize part count and improve reliability.

SUMMARY OF THE INVENTION

A method for measuring a level of a material in a tank is contemplated which includes the steps of providing a stepped frequency microwave signal to an antenna of a transmitter and receiving in the antenna a received signal from a surface of the material at the level to be measured. The method further includes processing the received signal and the stepped frequency microwave signal to determine the level of the material in the tank.

A device for measuring a level of a material in a tank is also contemplated. The device includes an antenna and a stepped frequency transmitter/receiver coupled to the antenna. The stepped frequency transmitter/-receiver provides a first stepped frequency microwave signal to the antenna to be transmitted to the level of the material in the tank to be measured. The stepped frequency transmitter/receiver receives a second stepped frequency microwave signal in response to the first stepped frequency microwave signal. A signal processor provides processing of a measuring signal derived from the stepped frequency microwave signal and the received signal to determine the level of the material in the tank.

The above and other features and advantages of the present invention will be better understood from the following detailed description taken in conjunction with the accompanying drawings.

BRIEF DESCRIPTION OF THE DRAWINGS

In FIG. 1, there is shown a side view of a combination transmitter, receiver, signal processor and data formatting assembly comprising a level measuring device mounted on the viewing port of a storage tank in accordance with the preferred embodiment of the invention;

In FIG. 2, there is shown a top view of a planar antenna suitable for mounting on the pressure window of a viewing port of a storage tank as in FIG 1;

DETAILED DESCRIPTION OF THE PREFERRED EMBODIMENT

Figure 3:
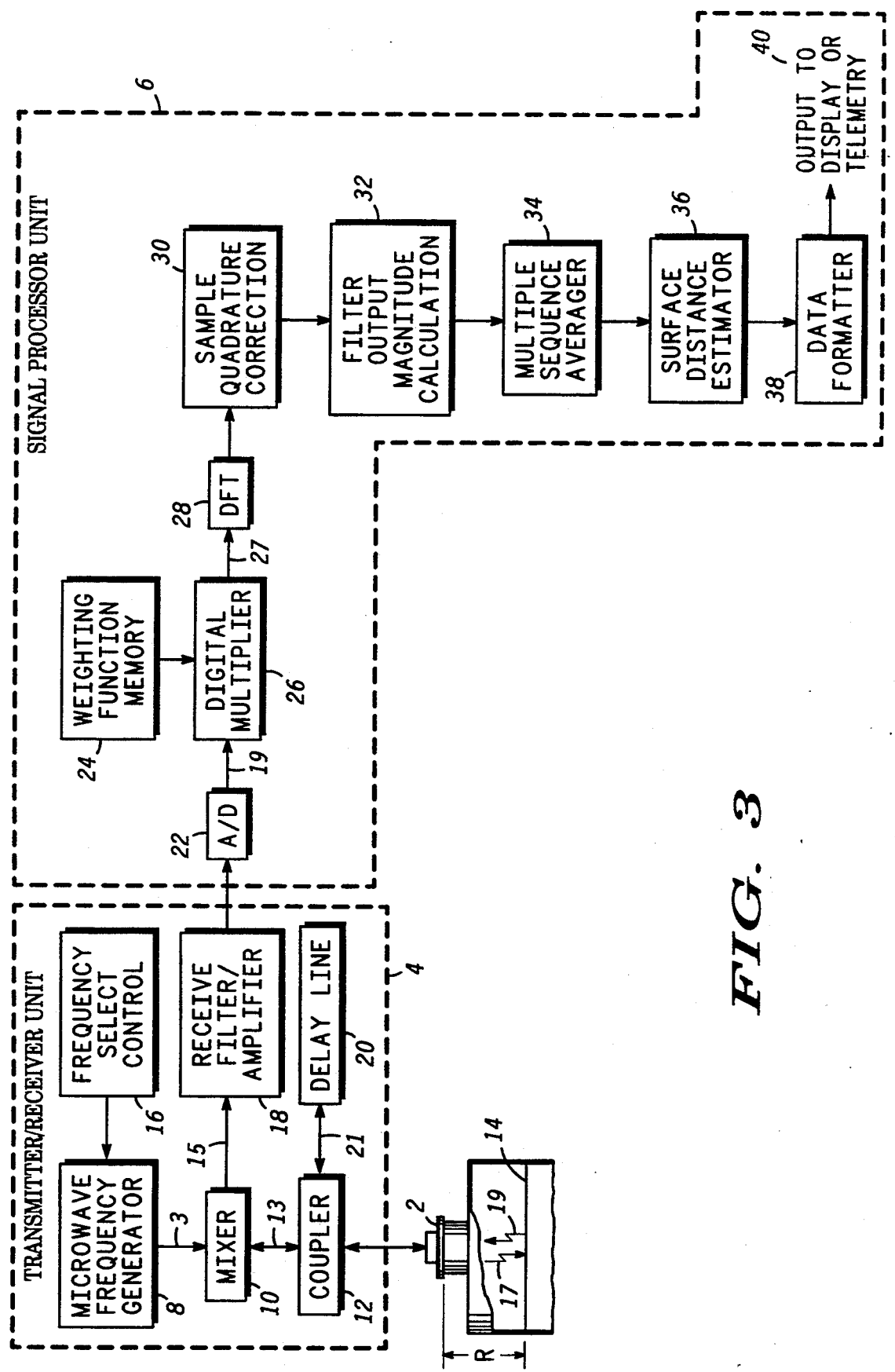
In FIG. 3, there is shown a block diagram of a transmitter, receiver, and signal processor comprising a level measuring device in accordance with the preferred embodiment of the invention.

In FIG. 1, there is shown a side view of a combination transmitter, receiver, signal processor and data formatting assembly comprising a level measuring device mounted on the viewing port of a storage tank in accordance with the preferred embodiment of the invention. The measuring apparatus comprising a transmitter, receiver, processor and data formatting assembly mount in an existing roof port or viewing port 7 on a storage tank roof 9 as shown in FIG. 1. Such a port 7 is often approximately 15 to 30 centimeters (cm) (i.e., six to twelve inches) in diameter. A pressure window of glass, ceramic, Plexiglas or other structural material, which allows the passage of microwaves, can be affixed to the port 7 in such a way as to provide a tight seal. A planar microwave antenna 2 can then be mounted to the glass window such that the microwave beam which emanates from the antenna is directed downward through the pressure window 5 toward the target surface level 14 on which a height, or depth, measurement is to be made for a material in the tank. The transmitter/receiver and processor 1 electronics can be mounted directly behind the antenna 2 in a small compact housing.

In FIG. 2, there is shown a top view of a planar antenna suitable for mounting on the pressure window of a viewing port of a storage tank as in FIG. 1. The antenna 2 in FIG. 2 is shown as an array of printed circuit radiating elements 11. Sixteen radiating elements 11 are shown in the preferred embodiment in FIG. 2, but other numbers of radiating elements and geometric configurations of radiating elements could be used. The radiating elements 11 shown in FIG. 2 can be connected to the transmit/receive electronics of the level-measuring device via a corporate feed network of microwave splitters which are known in the art. With such a design, the microwave paths to all elements are of equal length and the antenna 2 can be constructed in a planar fashion to have the bandwidth necessary to support the transmitted waveform. Also note that, while the preferred embodiment in FIG. 1 illustrates a planar microwave antenna 2, it is not required that the antenna 2 be a planar microwave antenna. Various other antenna configurations are readily adaptable and could be used.

In FIG. 3, there is shown a block diagram of a transmitter, receiver, and signal processor comprising a level measuring device in accordance with the preferred embodiment of the invention. The level-measuring device represented in FIG. 3 comprises a transmitter/receiver unit 4, a signal processor unit 6, and an antenna 2 (which is shown in the preferred embodiment of FIG. 3 as a planar antenna).

The transmitter/receiver unit 4 in FIG. 3 comprises a microwave frequency generator 8 coupled to a frequency select control 16 and a mixer 10. A coupler 12 is also coupled to the mixer 10 as well as to delay line 20 and planar antenna 2. Mixer 10 is also coupled to receiver filter/amplifier 18.

Signal processor unit 6 comprises an analog to digital (A/D) converter 22 coupled to the receiver filter/amplifier 18 of the transmitter/receiver unit 4. Signal processor unit 6 also comprises a digital multiplier 26 coupled to the A/D converter 22 as well as to a weighting function memory 24. The digital multiplier 26 is coupled to a discrete Fourier transform (DFT) 28. Sample quadrature correction 30 is coupled between the DFT 28 and the filter output magnitude calculator 32. Multiple sequence averager 34 is coupled to filter output magnitude calculator 32. Surface distance estimator 36 is coupled between data formatter 38 and the multiple sequence averager 34.

The microwave frequency generator 8 in FIG. 3 can be a device commonly known in the art which produces a stepped frequency microwave signal 3 at any one of 2N stable frequencies as selected by programmable frequency select control device 16. The frequency select control device 16 can be programmed to sequentially step through the 2N frequencies, dwelling for a time $t_d$ at each frequency. The stepped microwave frequency signals 3 from the microwave generator 8 are applied to the mixer 10. The mixer 10 has a controlled leakage whereby a portion 13 of the stepped frequency microwave signal 3 applied at its input is passed on to the antenna 2, through the coupler 12, and radiated toward the target surface level 14 of the tank contents. In the coupler 12 a second portion 21 of the stepped frequency microwave signal 3 transmitted signal is diverted to a delay line 20 of known length which provides a reference target for calibration purposes.

The antenna 2 serves as both a transmitting antenna and a receiving antenna. Signal 17 is the transmitted signal to level 14. Signal 19 is the signal reflected from the target surface level 14 back toward the antenna 2. Signal 19 is received by the antenna 2 and applied to the mixer 10 through the coupler 12. The reflected signal 19 is mixed by the mixer 10 with the microwave signal 3 coming directly from the microwave frequency generator 8 to produce a measuring signal portion of signal 15 to be input into receive filter/amplifier 18. The reflected signal 19 is of exactly the same frequency as the microwave frequency signal 3, but differs in phase by an amount which is directly proportional to the distance from the antenna 2 to level 14. If the microwave frequency signal has a frequency $f_n$, the distance to be measured is R, and the velocity of electromagnetic; microwave signal is c (the speed of light), then the phase difference in radians between the direct microwave frequency signal 3 and the reflected signal 19 is given by:

$$\beta_n = \pi R f_n / c \qquad \text{Equation 1}$$

When two sinusoidal time varying waveforms of frequency f and phase difference $\beta$ are applied to a balanced detector, the output is given by:

$$E_{out} = K(\cos \beta - \cos (4\pi f t) + \text{higher order terms}) \qquad \text{Equation 2}$$

(see Skolnik, M. *Radar Handbook*, 2nd Edition, McGraw Hill, 1990, page 3.36, which is incorporated herein by reference). In this preferred embodiment of the invention, the balanced detector is a microwave mixer 10. A low pass filter following the mixer 10, a part of the receiver filter/amplifier 18 in FIG. 3, removes all but the cos $\beta$ phase term, where $\beta$ is $\beta_n$ as defined above.

Figure 4:
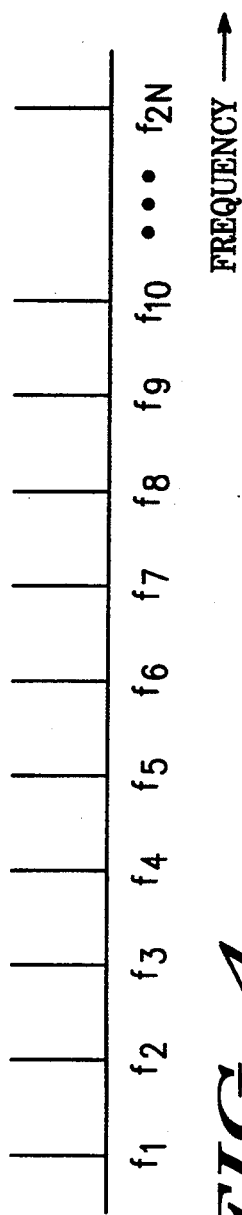
In FIG. 4, there is shown a representation of 2N discrete frequencies used in frequency stepping the transmitter, receiver, and signal processor in FIG. 3.

In FIG. 4, there is shown a representation of 2N discrete frequencies used in frequency stepping the transmitter, receiver, and signal processor in FIG. 3. In the preferred embodiment, the microwave frequency signal 3 which is transmitted is sequentially stepped through 2N frequencies from $f_1$ to $F_{2N}$ as shown. The frequency spacing between each frequency step is $f_{step}$. At each frequency, the microwave frequency signal 3 is transmitted for a dwell time $t_d$ while the output of the receiver filter/amplifier 18 is sampled and converted into a digital word by the ND converter 22. The output of receiver filter/amplifier 18, at a transmitted frequency $f_n$, is proportional to cos $\beta$ by Equation 2. For a given distance R to the target, the variation in the receiver filter/amplifier 18 output as the transmitted microwave frequency signals 3 are sequentially selected, will represent a unique sampled sinusoidal waveform as shown in FIG. 5.

Figure 5:
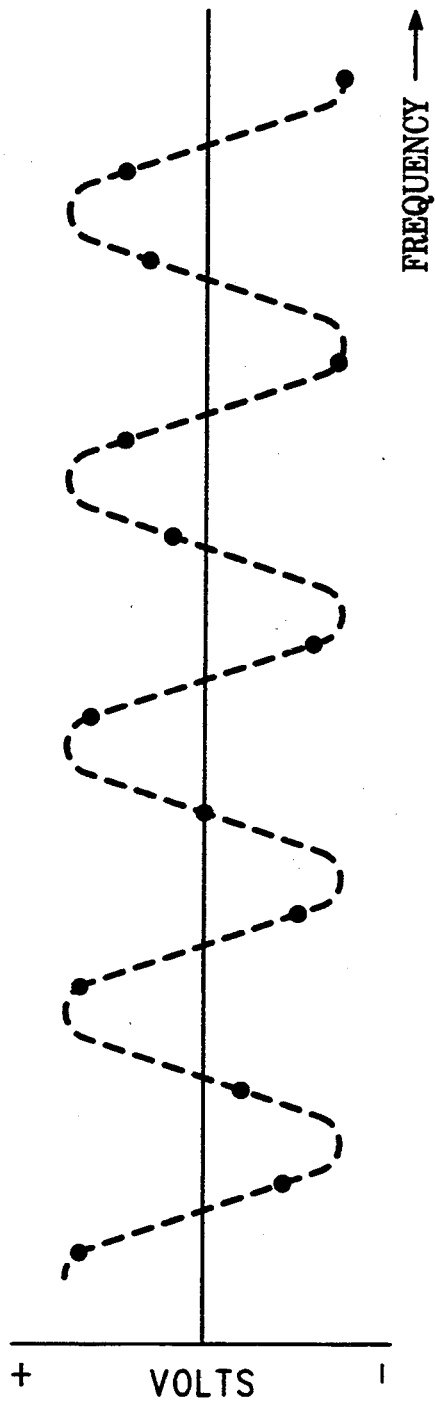
In FIG. 5, there is shown filtered mixer output voltages vs. frequency resulting from the processing of the stepped frequency microwave signals in FIG. 3.

The distance to the target surface (level 14) can be determined by finding the number of cycles in the waveform of FIG. 5 which are mapped out over the 2N frequency steps. The maximum distance $R_{max}$ that can be unambiguously measured is that distance which produces a full cycle in FIG. 5 over 2 frequency steps of 180 degrees of phase shift between frequency steps. In equation form:

$$R_{max} \leq c/(4f_{step}) \text{ or } f_{step} \leq c/(4R) \qquad \text{Equation 3}$$

Figure 6:
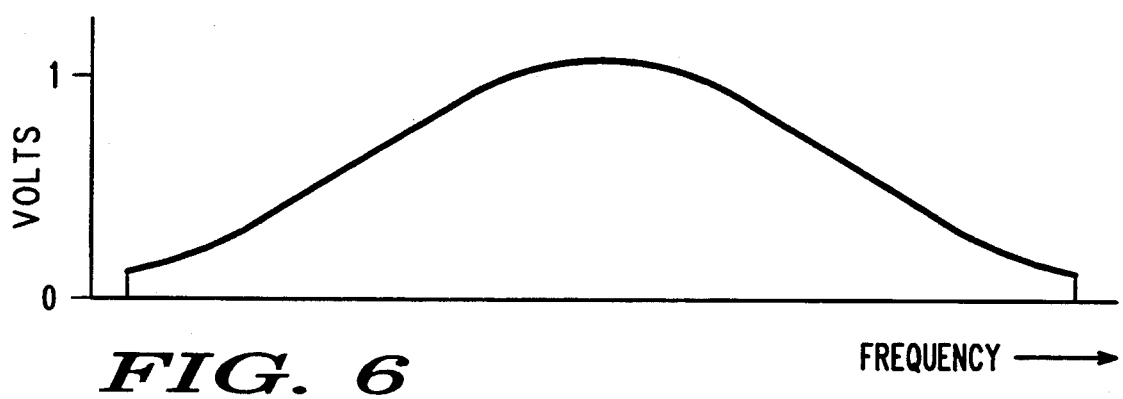
In FIG. 6, there is shown a voltage vs. frequency weighting function used in processing the stepped frequency microwave signals in FIG. 3.

Digital samples 19 from the ND converter 22 are weighted (multiplied) in the digital multiplier 26 using stored weights from the weighting function memory 24 to reduce transient effects prior to further processing. The envelop of the magnitudes of the stored weights is shown in FIG. 6. The 2N weighted digital samples 27 gathered from one frequency stepping sequence will, for the purposes of this description of the preferred embodiment, be referred to as one data record. From the data record of 2N samples, two N-sample sub-records are created. The N odd-numbered samples are placed in a record of "odds" and the N even-numbered samples are placed in a record of "evens". The odd and even sample sets comprise "in-phase" and "quadrature" sample input sets, respectively. The 2N samples are then processed by an N-point discrete Fourier transform (DFT) 28 algorithm.

The DFT 28, which can be a DFT known to those of ordinary skill in the art, acts as a bank of N contiguous narrowband digital filters which serve to isolate the filtered mixer output voltages from the receiver filter/amplifier 18 (FIG. 5) so that the signal frequency and thus the distance to the target surface can be determined. The DFT 28 performs a complex discrete Fourier transform on a set of N data pairs, each of which has a real component and an imaginary component, in the following way: In the preferred embodiment, the record of "odds" is used as the real input components and the record of "evens" is used as the imaginary input components for input to the DFT 28. The N complex output pairs of the DFT 28, each of which comprises a real component and an imaginary component, are then sorted, combined, and phase corrected in the sample quadrature corrector 30. By labeling the N real DFT 28 output components and the N imaginary DFT 28 output components as R(n) and I(n), respectively (where n=1,2, 3, . . . ), the processing in sample quadrature corrector 30 forms two new sets of real and imaginary outputs, $X_{real}(n)$ and $X_{imag}(n)$, using the following algorithms:

For n=1:

$$X_{real}(1)=R(1) \text{ and } X_{imag}(1)=I(1)$$

For n=2 to N:

$$\begin{aligned} X_{real}(n) = &[(R(n)+R(N+2-n)]/2 + \cos \\ &(\Omega(n))[I(n)+I(N+2-n)]/2 - \sin \\ &(\Omega(n))[R(n)-R(N+2-n)]/2 \end{aligned}$$

$$\begin{aligned} X_{imag}(n) = &[(I(n)-I(N+2-n)]/2 - \sin \\ &(\Omega(n))[I(n)+I(N+2-n)]/2 - \cos \\ &(\Omega(n))[R(n)-R(N+2-n)]/2 \end{aligned}$$

where $\Omega(n)=\pi(n-1)/N$ \qquad Equation 4

Each complex output sample pair is then converted, in filter output magnitude calculator 32 to a single digital magnitude word to form an N-sample output record $X_m(n)$, where the record of N samples contains the magnitudes of the true Fourier transform of the original 2N sample input data record and where:

$$X_m(n)=[(X_{real}(n))^2+(X_{imag}(n))^2]^{\frac{1}{2}} \qquad \text{Equation 5}$$

Figure 7:
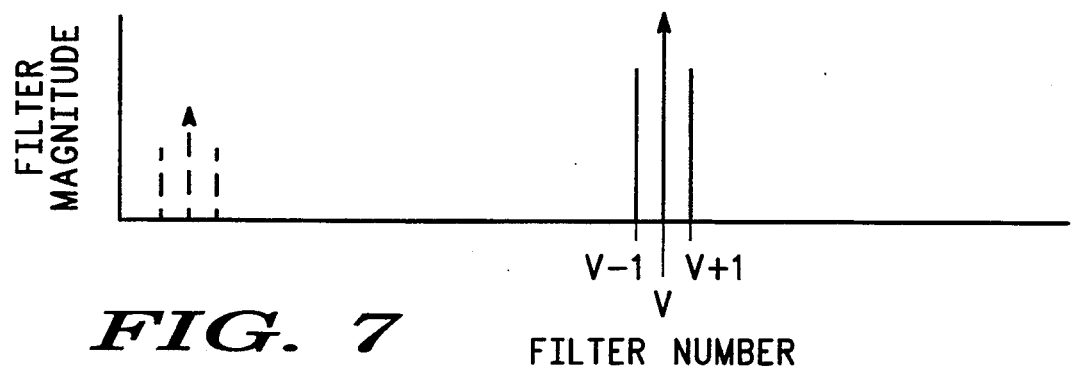
In FIG. 7, there is shown a diagram of filter output magnitudes from the apparatus in FIG. 3 when the target range is in the center of a filter; and In FIG. 8, there is shown a diagram of filter output magnitudes from the apparatus in FIG. 3 when the target range is between two filters.
Figure 8:
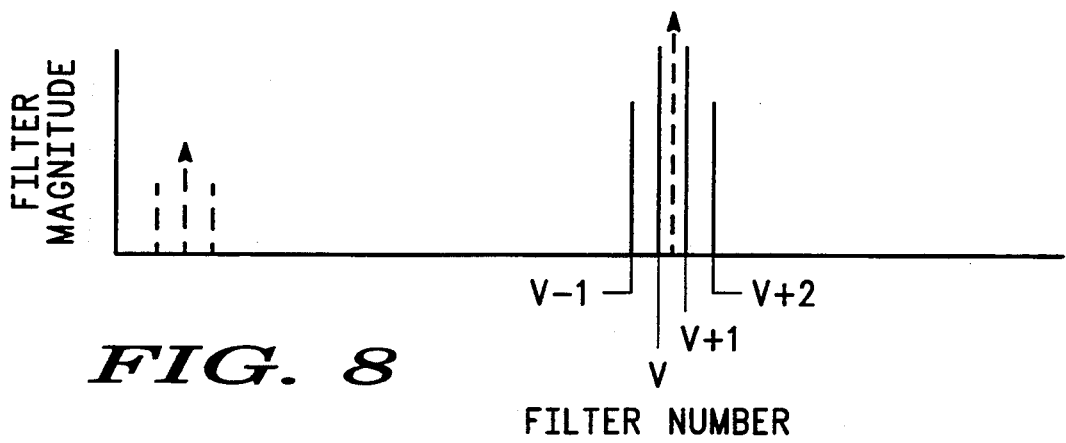

The above described processing completes one frequency-stepping sequence. The output records of M sequences are averaged in multiple sequence averager 34 in FIG. 3 to form a smoothed estimate of the output magnitudes of each of the N DFT filters. If the distance R to the level 14 results in a ranging frequency signal waveform whose frequency falls in the center of a DFT filter, a graph of the average output record will be similar to that in FIG. 7. The response from the calibration target is shown at left and the target at the center of filter V is shown at right in FIG. 7. Alternatively, if the distance R to the level 14 results in a waveform whose frequency falls midway between two DFT filters, a graph of the average output record will be similar to that in FIG. 8. The response from the calibration target is shown at left and the target between filters V and V+1 is shown at right in FIG. 8. An interpolation algorithm is implemented in surface distance estimator 36 in FIG. 3 to determine the true distance to the target surface level 14 based on the magnitudes of the outputs of the filters which are adjacent to the filter with the largest output.

The interpolation algorithm used in the preferred embodiment may be of the form:

$$R=(R_a+R_b)/2-[k(E_a-E_b)\mu]/(E_a+E_b) \qquad \text{Equation 6}$$

where $R_a$ and $R_b$ are the distances corresponding to the centers of the two filters having the largest magnitudes, $E_a$ and $E_b$ are the voltage magnitudes of those two filters, respectively, $\mu$ is the filter spacing in units of distance, and k is a constant that yields minimum error.

The algorithm may also be of the form:

$$R=(R_a+R_c)/2-[k_1(E_a-E_c)\mu]/(E_a+k_2E_b+E_c) \qquad \text{Equation 7}$$

where $R_a$ and $R_c$ are the distances corresponding to the centers of the outer two of three adjacent filters having the largest magnitudes, $E_a$, $E_b$, and $E_c$ are the voltage magnitudes of those three filters, respectively, $\mu$ is the filter spacing in units of distance, and $k_1$ and $k_2$ are constants that yield minimum error.

Using calibration frequency signal 21 in FIG. 3, which is supplied through mixer 10 as a portion of signal 15 to receiver filter/amplifier 18, the distances to the calibration target (delay line 20) and to the surface level 14 are estimated in this manner and the target surface distance measurement is corrected based on the calibration measurement. The target distance to level 14 is then formatted in data formatter 38 in FIG. 3 for output to a display on a local readout device or for telemetry to a remote readout location. Thus, the method involves measuring a first distance associated with the calibration frequency signal, measuring a second distance associated with the ranging frequency signal, comparing the first distance to a known (calibrated) delay line length to produce a determined error, and correcting the second distance with the determined error to determine the level of the material in the tank.

Thus, an apparatus and method has been described which overcomes specific problems and accomplishes certain advantages relative to prior art methods and mechanisms. The improvements over known technology are significant. The method and device described herein provide a low profile antenna implementation whereby the level measurement can be taken without entering the tank interior atmosphere. The method and apparatus use a waveform which does not require the complexity of sweeping the transmitted signal. A single receive path is used, with one microwave mixer, one receiver amplifier, and one ND converter (approximately half the parts of previous devices). The method and apparatus use all digital processing after the first receiver amplifier to minimize contributions to the measurement error. In addition, the method and apparatus use special digital processing algorithms to further minimize parts count and improve reliability.

Thus, there has also been provided, in accordance with an embodiment of the invention, an apparatus and method for level sensing using microwave signals that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method for measuring a level of a material in a tank, the method comprising the steps of:
   providing a stepped frequency microwave signal to an antenna of a transmitter;
   directing a transmitted signal toward the material in the tank;
   receiving in the antenna a received signal from a surface of the material at the level to be measured;
   mixing the received signal and the stepped frequency signal to produce a measuring signal;
   sampling the measuring signal to produce measured samples;
   multiplying the measured samples by stored weights;
   separating odd and even numbered sample sets comprising in-phase and quadrature sample input sets, respectively, from the measured samples;
   processing the in-phase and quadrature sample input sets in a bank of contiguous narrow band filters using a Fourier transform algorithm to produce a plurality of output records;
   processing the plurality of output records in a signal processor to produce a ranging frequency signal and a calibration frequency signal; and
   determining the level of the material from the ranging frequency signal and the calibration frequency signal.

2. A method as claimed in claim 1, wherein the steps of providing, directing, receiving, mixing, sampling, multiplying, separating, processing the in-phase and quadrature sample input sets, and processing the plurality of output records are repeated for a plurality of stepped frequency microwave signals.

3. A method as claimed in claim 1, wherein the step of processing the plurality of output records comprises the steps of:
   processing the in-phase and quadrature sample sets to form true in-phase and quadrature filter bank outputs;
   combining the true in-phase and quadrature filter bank outputs into a single set of filter outputs; and
   processing the single set of filter outputs to isolate the ranging frequency signal and the calibration frequency signal.

4. A method as claimed in claim 3, wherein the step of processing the measuring signal further comprises the steps of:
   measuring a first distance associated with the calibration frequency signal;
   measuring a second distance associated with the ranging frequency signal;
   comparing the first distance to a known delay line length to produce a determined error;
   correcting the second distance with the determined error to determine the level of the material in the tank.

5. A method as claimed in claim 1, wherein the step of processing the plurality of output records further comprises the step of averaging the plurality of output records.

6. An apparatus for measuring a level of a material in a tank comprising:
   an antenna;
   a stepped frequency transmitted receiver coupled to the antenna wherein the stepped frequency transmitter/receiver comprises:
   a microwave frequency generator;
   a frequency select control coupled to the microwave frequency generator, the frequency select control for controlling the microwave frequency generator;
   a mixer coupled to the microwave frequency generator, the mixer for mixing the second stepped frequency microwave signal and the first stepped frequency microwave signal to produce a measuring signal; and
   a filter/amplifier coupled to the mixer, the filter/amplifier for receiving the measuring signal and for producing a filter/amplifier output;
   a delay line of calibrated length; and
   a coupler coupled to the delay line and to the antenna, wherein the first stepped frequency microwave signal introduced into the delay line produces a calibration frequency signal, the stepped frequency transmitter/receiver for providing a first stepped frequency microwave signal to the antenna to be transmitted to the level of the material in the tank, and the stepped frequency transmitter/receiver for receiving a second stepped frequency microwave signal in response; and a signal processor for processing a measuring signal derived from the stepped frequency microwave signal and the received signal to determine the level of the material in the tank, wherein the signal processor comprises:
  an analog to digital (A/D) converter coupled to the filter/amplifier of the transmitter/receiver, the A/D converter for receiving the filter/amplifier output and for producing digital samples;
  a digital multiplier coupled to the A/D converter, the digital multiplier for multiplying the digital samples by a plurality of weights;
  a discrete Fourier transform (DFT) coupled to the digital multiplier, the DFT for filtering the digital samples to produce output sample pairs;
  a sample quadrature corrector coupled to the DFT, the sample quadrature corrector for sorting, combining, and phase correcting the output sample pairs; and
  a filter output magnitude calculator coupled to the sample quadrature corrector, the filter output magnitude calculator for converting the output sample pairs to output records.

7. An apparatus as claimed in claim 6, wherein the antenna comprises a planar antenna.

8. An apparatus as claimed in claim 6, wherein the signal processor further comprises:
  a weighting function memory coupled to the digital multiplier, the weighting function memory for storing weights for multiplying the digital samples to reduce transient effects;
  a multiple sequence averager coupled to the filter output magnitude corrector, the multiple sequence averager for averaging the output records;
  a surface distance estimator coupled to the multiple sequence averager, the surface distance estimator for determining the distance to the level of the material; and
  a data formatter coupled to the surface distance estimator, the data formatter for producing an output to display or telemetry in response to the determination of the distance to the level of the material.

9. A method for measuring a level of a material in a tank, the method comprising the steps of:
  providing a stepped frequency microwave signal to an antenna of a transmitter, wherein the stepped frequency microwave signal is directed at the level of the material;
  receiving in the antenna a received signal from a surface of the material at the level to be measured; and
  mixing the received signal and a first stepped frequency microwave signal to produce a measuring signal; and
  producing a filter/amplifier output from a filter/amplifier in response to the measuring signal;
  receiving the filter/amplifier output in an analog to digital (A/D) converter;
  producing digital samples from the A/D converter;
  multiplying the digital samples in a digital multiplier to produce multiplied digital samples;
  filtering the multiplied digital samples in a discrete Fourier transform (DFT) to produce output sample pairs;
  phase correcting the output sample pairs in a sample quadrature corrector;
  converting the output sample pairs to output records in a filter output magnitude calculator; and
  producing a calibration frequency signal in a delay line in response to the stepped frequency microwave signal to determine the level of the material in the tank.

10. A method as claimed in claim 9, wherein the step of providing a stepped frequency microwave signal comprises the step of controlling a microwave frequency generator with a frequency select control.

11. A method as claimed in claim 9 further comprising the step of storing weights in a weighting function memory to reduce transient effects.

12. A method as claimed in claim 9 further comprising the steps of:
  averaging the output records in a multiple sequence averager;
  determining the distance to the level of the material in a surface distance estimator; and
  producing an output to display or telemetry in response to the determination of the distance to the level of the material in a data formatter.

* * * * *

UNITED STATES PATENT AND TRADEMARK OFFICE
CERTIFICATE OF CORRECTION

PATENT NO. : 5,406,842
DATED : April 18, 1995
INVENTOR(S) : John W. Locke

It is certified that error appears in the above-indentified patent and that said Letters Patent is hereby corrected as shown below:

Column 8, claim 6, line 43, replace the words "transmitted receiver" with --transmitter/receiver--.

Column 9, claim 6, line 12, the "AID" should be --A/D--.

Signed and Sealed this

Twenty-sixth Day of September, 1995

Attest:

BRUCE LEHMAN

*Attesting Officer*     *Commissioner of Patents and Trademarks*